United States Patent
Ohmori

(10) Patent No.: US 9,350,177 B2
(45) Date of Patent: May 24, 2016

(54) EQUALIZATION CIRCUIT, POWER SUPPLY SYSTEM, AND VEHICLE

(75) Inventor: Chikara Ohmori, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 208 days.

(21) Appl. No.: 14/238,164

(22) PCT Filed: Aug. 2, 2012

(86) PCT No.: PCT/JP2012/004909
§ 371 (c)(1),
(2), (4) Date: Feb. 10, 2014

(87) PCT Pub. No.: WO2013/021589
PCT Pub. Date: Feb. 14, 2013

(65) Prior Publication Data
US 2014/0210415 A1 Jul. 31, 2014

(30) Foreign Application Priority Data

Aug. 11, 2011 (JP) .................................. 2011-175970

(51) Int. Cl.
*H02J 7/00* (2006.01)
*H01M 10/44* (2006.01)
(Continued)

(52) U.S. Cl.
CPC ........... *H02J 7/0016* (2013.01); *B60L 11/1866* (2013.01); *H01M 10/42* (2013.01);
(Continued)

(58) Field of Classification Search
CPC ..... H02J 7/0014; H02J 7/0019; H02J 7/0024; H02J 7/0091; H02J 7/0016; G01R 31/3658; B60L 11/1866; B60L 2240/80; B60L 2240/547; B60L 2240/545; B60L 2240/549; H01M 10/443; H01M 10/42; H01M 10/486; H01M 10/44; H01M 2010/4271; Y02T 10/7055; Y02T 10/7005; Y02T 10/7061
See application file for complete search history.

(56) References Cited

U.S. PATENT DOCUMENTS 6,225,780 B1  5/2001 Koch
6,404,165 B1  6/2002 Shinpo et al.
(Continued)

FOREIGN PATENT DOCUMENTS

JP  2001-275268 A  10/2001
JP  2004-254385 A  9/2004
(Continued)

OTHER PUBLICATIONS

Extended European Search Report dated Dec. 15, 2014 issued in corresponding European Patent Application No. 12822501.8.
(Continued)

*Primary Examiner* — Nha Nguyen
(74) *Attorney, Agent, or Firm* — McDermott Will & Emery LLP

(57) ABSTRACT

An equalization circuit includes: discharge sections which are provided correspondingly to secondary batteries respectively, and discharge the corresponding secondary batteries to convert energy resulting from the discharge into heat; a temperature detector which detects a temperature under the converted heat; and an equalization controller which selects a discharge section as a selection discharge section, the selection discharge section corresponding to a secondary battery of the secondary batteries to be discharged, the equalization controller causing the selection discharge section to discharge the corresponding secondary battery, and equalizing electric quantities accumulated in the secondary batteries, wherein if the secondary battery is discharged by the selection discharge section and if the temperature detected by the temperature detector is higher than a predetermined reference temperature, the equalization controller reduces a discharge current to a value lower than a value when the temperature is lower than the reference temperature.

7 Claims, 5 Drawing Sheets

(51) Int. Cl.
*H01M 10/42* (2006.01)
*H01M 10/48* (2006.01)
*B60L 11/18* (2006.01)

(52) U.S. Cl.
CPC ........... *H01M 10/44* (2013.01); *H01M 10/443* (2013.01); *H01M 10/486* (2013.01); *H02J 7/0091* (2013.01); *B60L 2240/545* (2013.01); *B60L 2240/547* (2013.01); *B60L 2240/549* (2013.01); *B60L 2240/80* (2013.01); *H01M 2010/4271* (2013.01); *Y02T 10/7005* (2013.01); *Y02T 10/7055* (2013.01); *Y02T 10/7061* (2013.01)

(56) References Cited

U.S. PATENT DOCUMENTS

| | | | |
|---|---|---|---|
| 2006/0022639 A1 | 2/2006 | Moore | |
| 2010/0033135 A1* | 2/2010 | Nishida | B60L 3/0046 320/136 |
| 2011/0050169 A1* | 3/2011 | Akiba | H02J 7/0016 320/109 |
| 2012/0094151 A1* | 4/2012 | Kim | H02J 7/00 429/50 |
| 2012/0119709 A1 | 5/2012 | Mull et al. | |

FOREIGN PATENT DOCUMENTS

| | | |
|---|---|---|
| JP | 2006-115640 A | 4/2006 |
| JP | 2007-014148 A | 1/2007 |
| JP | 2007-325458 A | 12/2007 |
| JP | 2008-054416 A | 3/2008 |
| JP | 2008-228518 A | 9/2008 |
| JP | 2009-081958 A | 4/2009 |
| JP | 2010-142039 A | 6/2010 |
| WO | 2010038347 A1 | 4/2010 |

OTHER PUBLICATIONS

International Search Report issued in PCT/JP2012/004909, dated Aug. 28, 2012, with English translation, 4 pages.

* cited by examiner

EQUALIZATION CIRCUIT, POWER SUPPLY SYSTEM, AND VEHICLE

RELATED APPLICATIONS

This application is the U.S. National Phase under 35 U.S.C. §371 of International Application No. PCT/JP2012/004909, filed on Aug. 2, 2012, which in turn claims the benefit of Japanese Application No. 2011-175970, filed on Aug. 11, 2011, the disclosures of which Applications are incorporated by reference herein.

TECHNICAL FIELD

The present invention relates to an equalization circuit which reduces imbalance in accumulated electric quantities of secondary batteries, a power supply system which includes the equalization circuit, and a vehicle which includes the power supply system.

BACKGROUND ART

In recent years, as represented by a vehicle-mounted secondary battery mounted on a vehicle as a power supply in a hybrid car which uses an engine and an electric motor in combination and an electric vehicle, the use of a power supply system in which a high voltage is output by connecting a large number of secondary batteries in series is growing. Such a power supply system is configured by connecting, in series, a large number of the secondary batteries of, e.g., 80 cells to 500 cells. Hence, it is difficult to secure the reliability of the entire power supply system.

Specifically, in such a power supply system, variations in characteristics occurring in the manufacturing process of the secondary battery constituting the power supply system cause variations in the accumulated charge amount (accumulated electric quantity) charged in the respective secondary batteries.

When the charge and discharge of the power supply system are repeated in the state where there are variations in the accumulated charge amount, the degradation of the secondary battery larger or smaller in accumulated charge amount than the other secondary batteries may be accelerated. That is, when the power supply system is charged, the secondary battery which is already larger in accumulated charge amount than the other secondary batteries before starting the charge is fully charged earlier than the other secondary batteries. Hence, the secondary battery tends to be overcharged, and the degradation of the secondary battery larger in accumulated charge amount may be accelerated. On the other hand, when the power supply system is discharged, the accumulated charge amount of the secondary battery which is already smaller in accumulated charge amount than the other secondary batteries before starting the discharge is reduced to zero earlier than the accumulated charge amounts of the other secondary batteries. Hence, the secondary battery tends to be overdischarged, and the degradation of the secondary battery smaller in accumulated charge amount may be accelerated.

In the secondary battery of which the degradation is accelerated, its capacity is reduced and its life is shortened. In the case of the power supply system, when a part of the secondary batteries is degraded, the entire power supply system becomes unusable or the reliability thereof is lowered. Therefore, the degradation of the secondary battery caused by the variations in the accumulated charge amount has a large impact on the entire power supply system. Consequently, in the power supply system which uses a large number of the secondary batteries, it is desired to equalize the accumulated charge amounts of the respective secondary batteries, i.e., the terminal voltages thereof.

To cope with this, there is known an equalization circuit which performs equalization processing which reduces imbalance in the accumulated charge amounts and the terminal voltages of the respective secondary batteries (see, e.g., Patent Document 1 and Patent Document 2). In this equalization circuit, the secondary battery which is larger in the accumulated charge amount than the other secondary batteries and is accordingly higher in the terminal voltage than the other secondary batteries is discharged via a resistance load or a transistor. Accordingly, the redundant accumulated charge amount is released by converting the redundant accumulated charge amount into thermal energy.

However, when the redundant accumulated charge is released by converting it into the thermal energy, the ambient temperature of the equalization circuit rises. As a result, the ambient temperature of an electronic component disposed in the vicinity of the equalization circuit may exceed the guaranteed operating range of the electronic component. In order to maintain the ambient temperature within the guaranteed operating range of the electronic component in the vicinity thereof, it is only necessary to set the value of a discharge current when the equalization is performed to a small value. However, when the discharge current is reduced, there has been an inconvenience that a time period required for the equalization processing for reducing the imbalance between the secondary batteries is increased.

Patent Document 1: Japanese Patent Application Laid-open No. 2010-142039

Patent Document 2: Japanese Patent Application Laid-open No. 2008-54416

SUMMARY OF INVENTION

An object of the present invention is to provide an equalization circuit, and a power supply system and a vehicle which include the equalization circuit, the equalization circuit being capable of reducing an increase in time period required for the equalization processing while reducing a risk that the ambient temperature exceeds a predetermined temperature due to heat generation caused by the equalization processing of the secondary battery.

An equalization circuit according to the present invention includes: discharge sections which are provided correspondingly to secondary batteries respectively, and discharge the corresponding secondary batteries to convert energy resulting from the discharge into heat; a temperature detector which detects a temperature under the converted heat; and an equalization controller which selects a discharge section as a selection discharge section, the selection discharge section corresponding to a secondary battery of the secondary batteries to be discharged, the equalization controller causing the selection discharge section to discharge the corresponding secondary battery, and equalizing electric quantities accumulated in the secondary batteries, wherein if the secondary battery is discharged by the selection discharge section and if the temperature detected by the temperature detector is higher than a predetermined reference temperature, the equalization controller reduces a discharge current to a value lower than a value when the temperature is lower than the reference temperature.

In addition, a power supply system according to the present invention includes the above-described equalization circuit and the secondary batteries.

Further, a vehicle according to the present invention includes the above-described power supply system, and the equalization controller causes the selection discharge section to discharge the secondary battery when the vehicle is not running The thus-configured equalization circuit, power supply system, and vehicle are capable of reducing an increase in time period required for the equalization processing while reducing the risk that the ambient temperature exceeds the predetermined temperature due to heat generation caused by the equalization processing of the secondary battery.

DESCRIPTION OF EMBODIMENTS

Figure 1:
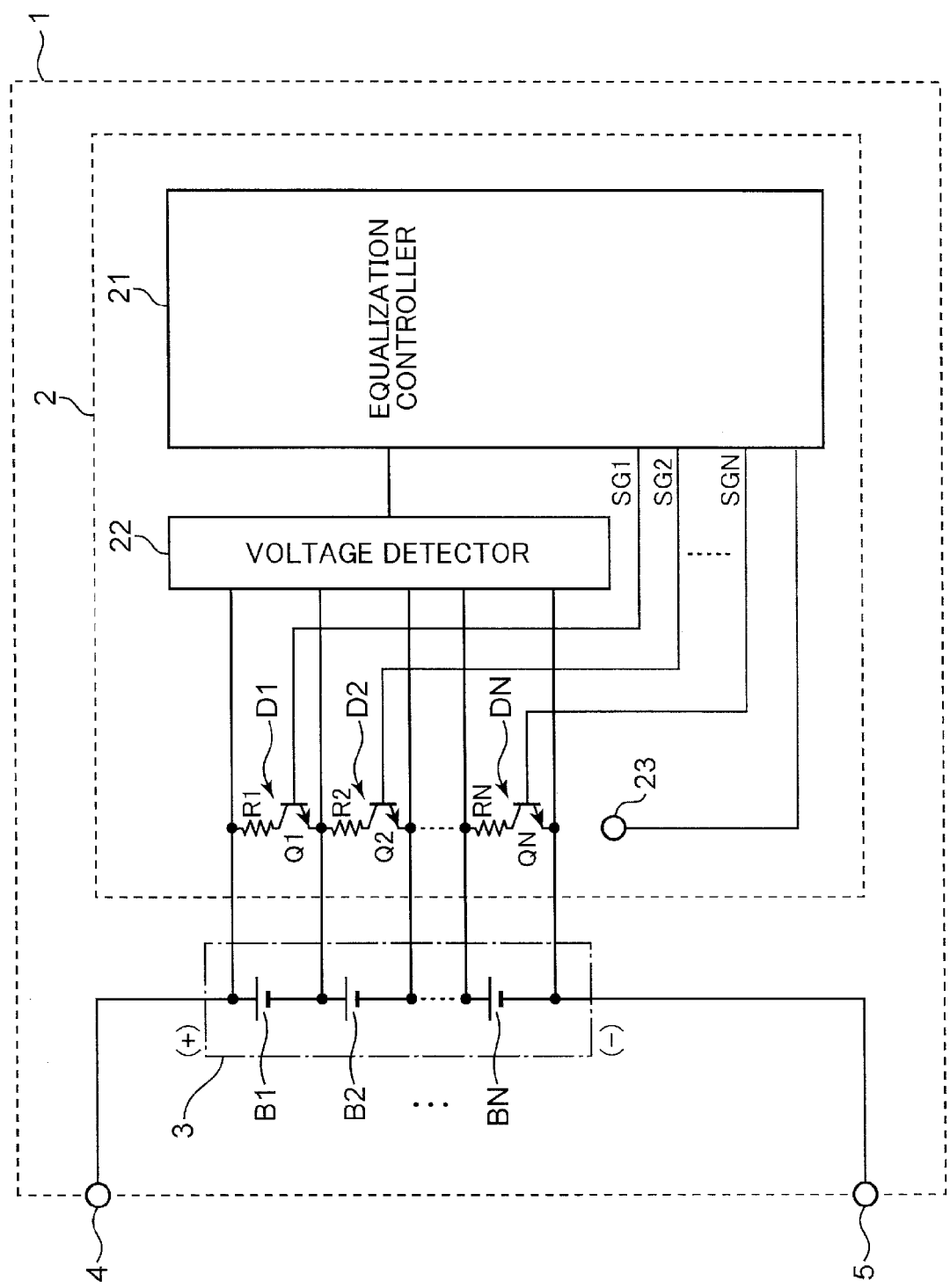
FIG. 1 is a block diagram showing an example of the configuration of a power supply system which includes an equalization circuit according to an embodiment of the present invention.

Hereinbelow, an embodiment according to the present invention will be described based on the drawings. Note that, in each of the drawings, elements designated by the same reference numerals are the same elements and the repeated description thereof will be omitted. FIG. 1 is a block diagram showing an example of the configuration of a power supply system which includes an equalization circuit according to the embodiment of the present invention.

A power supply system 1 shown in FIG. 1 includes an equalization circuit 2, an assembled battery 3, and connection terminals 4 and 5. The power supply system 1 is mounted on vehicles such as, e.g., an electric vehicle and a hybrid car, and is used as a power supply for driving a motor used in the running of the vehicle. In addition, the power supply system 1 may also be used as various power supply systems such as, e.g., a battery pack, an uninterruptible power supply system, a power storage device for electric power conditioning which stores surplus electric power of a generator using natural energy or a generator using an engine as its power source, and a load leveling power supply. A load which receives electric power supplied from the power supply system 1 and a charger for charging the power supply system 1 are connected between the connection terminals 4 and 5.

The assembled battery 3 is configured by connecting N secondary batteries $B1, B2, \ldots, BN$ in series. The secondary batteries $B1, B2, \ldots, BN$ are accommodated in a box (not shown). As the secondary batteries $B1, B2, \ldots, BN$, there can be used various secondary batteries such as, e.g., lithium-ion secondary batteries and nickel-metal hydride secondary batteries. Hereinafter, the secondary batteries $B1, B2, \ldots, BN$ are collectively referred to as a secondary battery B.

As the secondary battery B, there can be used various secondary batteries such as, e.g., the lithium-ion secondary battery and the nickel-metal hydride secondary battery. Note that the secondary battery B may also be a cell. In addition, the secondary battery B may also be an assembled battery configured by connecting cells in series or in parallel. Alternatively, the secondary battery B may be an assembled battery in which cells are connected to each other by a connection method in which serial connection and parallel connection are combined.

The connection terminal 4 is connected to the positive electrode of the assembled battery 3, while the connection terminal 5 is connected to the negative electrode of the assembled battery 3.

The equalization circuit 2 is configured as, e.g., a vehicle-mounted ECU (Electric Control Unit). The equalization circuit 2 includes an equalization controller 21, a voltage detector 22, a temperature detector 23, N resistors $R1, R2, \ldots, RN$, and N transistors (an example of a switching element) $Q1, Q2, \ldots, QN$. A series circuit of the resistor R1 and the transistor Q1 is connected to the secondary battery B1 in parallel, a series circuit of the resistor R2 and the transistor Q2 is connected to the secondary battery B2 in parallel, and subsequent series circuits of the resistors and the transistors are connected to the corresponding secondary batteries in parallel, respectively.

The series circuit of the resistor R1 and the transistor Q1 serves as a discharge section D1 corresponding to the secondary battery B1, the series circuit of the resistor R2 and the transistor Q2 serves as a discharge section D2 corresponding to the secondary battery B2, and the series circuit of the resistor RN and the transistor QN serves as a discharge section DN corresponding to the secondary battery BN. Hereinafter, the discharge sections D1 to DN are collectively referred to as a discharge section D, the resistors R1 to RN are collectively referred to as a resistor R, and the transistors Q1 to QN are collectively referred to as a transistor Q.

Note that the discharge section D is not limited to the series circuit of the resistor and the switching element. The discharge section D may have any configuration as long as it discharges the secondary battery B connected in parallel and converts energy resulting from the discharge into heat. For example, by operating the transistor in an unsaturated zone, the discharge section D may also be configured only by the transistor without using the resistor.

The voltage detector 22 detects terminal voltages $V1, V2, \ldots, VN$ of the secondary batteries $B1, B2, \ldots, BN$, and outputs the detected values to the equalization controller 21. The voltage detector 22 is configured by using, e.g., an analogue-digital converter.

The temperature detector 23 is a temperature sensor configured by using, e.g., a thermocouple, a thermistor, or the like. The temperature detector 23 is disposed, e.g., in the vicinity of the discharge section D, and detects the ambient temperature resulting from heat generated when the secondary battery B is discharged by the discharge section D. That is, the energy emitted from the secondary battery B by the discharge is converted into heat by the discharge section D. The temperature detector 23 detects the temperature of a portion under the converted heat.

Alternatively, the temperature detector 23 may detect the temperature of a printed circuit board on which the resistor R is mounted as a temperature T. The temperature detector 23 may also detect the temperature in the vicinity of another electronic component, the equalization controller 21 for example, mounted on the printed circuit board on which the resistor R is mounted as the temperature T. The temperature detector 23 may also detect the internal temperature of a case of the ECU, in which the electronic components such as the equalization controller 21 and the like are accommodated together with the resistor R, as the temperature T.

Of the guaranteed operating temperatures of the electronic components mounted on the printed circuit board on which the resistor R is mounted or the electronic components accommodated in the case of the ECU together with the resistor R, the lowest temperature serves as a guaranteed operating upper limit temperature Tmax. In addition, a temperature obtained by subtracting a margin from the guaranteed operating upper limit temperature Tmax serves as a stop temperature Ts. Specifically, in a case where the guaranteed operating upper limit temperature Tmax is 85° C., the stop temperature Ts is set to, e.g., 75° C. which is lower than the guaranteed operating upper limit temperature Tmax by 10° C.

The transistors Q1, Q2, . . . , QN are turned on (closed) and off (opened) in response to equalization discharge signals SG1, SG2, . . . , SGN from the equalization controller 21. When the transistors Q1, Q2, . . . , QN are turned on, the secondary batteries connected in parallel to the transistors which are turned on are discharged via the resistors.

The equalization controller 21 includes, e.g., a CPU (Central Processing Unit) which executes predetermined arithmetic processing, a ROM (Read Only Memory) in which a predetermined control program is stored, a RAM (Random Access Memory) which temporarily stores data, and their peripheral circuits.

The equalization controller 21 executes, e.g., the control program stored in the ROM to execute the equalization processing of the secondary batteries B1, B2, . . . , BN. As the equalization processing, the equalization controller 21 causes the discharge section D to discharge at least one of the secondary batteries B1, B2, . . . , BN, and reduces a difference between the terminal voltages V1, V2, . . . , VN detected by the voltage detector 22.

In a case where the power supply system 1 is mounted as a power supply for driving a motor (for the running) of a vehicle, the equalization controller 21 executes the equalization processing when the vehicle is not running (when the motor is not driven). When the equalization processing is executed while the vehicle is running, there is a risk that the output current of the assembled battery 3 may be reduced due to the discharge for the equalization, and that electric power supplied to the motor by the assembled battery 3 may become smaller than electric power required for the running of the vehicle.

When the vehicle is not running includes when the motor is not driven because the vehicle stops at a red light and the like, and when the motor is not driven because the vehicle is parked in a parking lot and a key is turned off.

Consequently, the equalization controller 21 executes the discharge by a selection discharge section in the equalization processing when the vehicle is not running (when the motor is not driven). With this, the risk of shortage of the electric power required for the running due to the discharge for the equalization processing is reduced.

The equalization controller 21 specifically performs the following processing as an example of the equalization processing. For example, the equalization controller 21 selects the secondary battery B having the terminal voltage V1, V2, . . . , or VN detected by the voltage detector 22 exceeding a pre-set target voltage Vtg as a target secondary battery to be discharged. The equalization controller 21 selects the discharge section D corresponding to the target secondary battery to be discharged as the selection discharge section. Subsequently, the equalization controller 21 causes the selection discharge section to execute the discharge until the terminal voltage of the target secondary battery to be discharged becomes equal to the target voltage Vtg. With this, variations in the accumulated charge amounts between the secondary batteries B1, B2, . . . , BN (i.e., in the electric quantities accumulated in the respective secondary batteries B), that is, an imbalance therein is reduced.

For example, an end-of-discharge voltage, at which the discharge of the secondary battery B should be stopped, is used as the target voltage Vtg.

Note that the equalization processing only needs to be processing which reduces variations in the accumulated charge amount between the secondary batteries by discharging the secondary battery using the discharge section D. Consequently, the method thereof is not limited to the method described above, and various methods can be used as the equalization processing.

Subsequently, when the temperature T detected by the temperature detector 23 is higher than a predetermined reference temperature Tr, the equalization controller 21 reduces a discharge current in the equalization processing to a value lower than the value of the discharge current when the temperature T is lower than the reference temperature Tr. In addition, when the temperature T is not less than the stop temperature Ts, the equalization controller 21 turns off all of the transistors Q, and does not execute the equalization processing.

As the reference temperature Tr, a temperature which is sufficiently lower than the stop temperature Ts and is higher than the maximum value of the outside air temperature in a use environment where the power supply system 1 is assumed to be used is set. Specifically, the reference temperature Tr is set to, e.g., 55° C.

Figure 2:
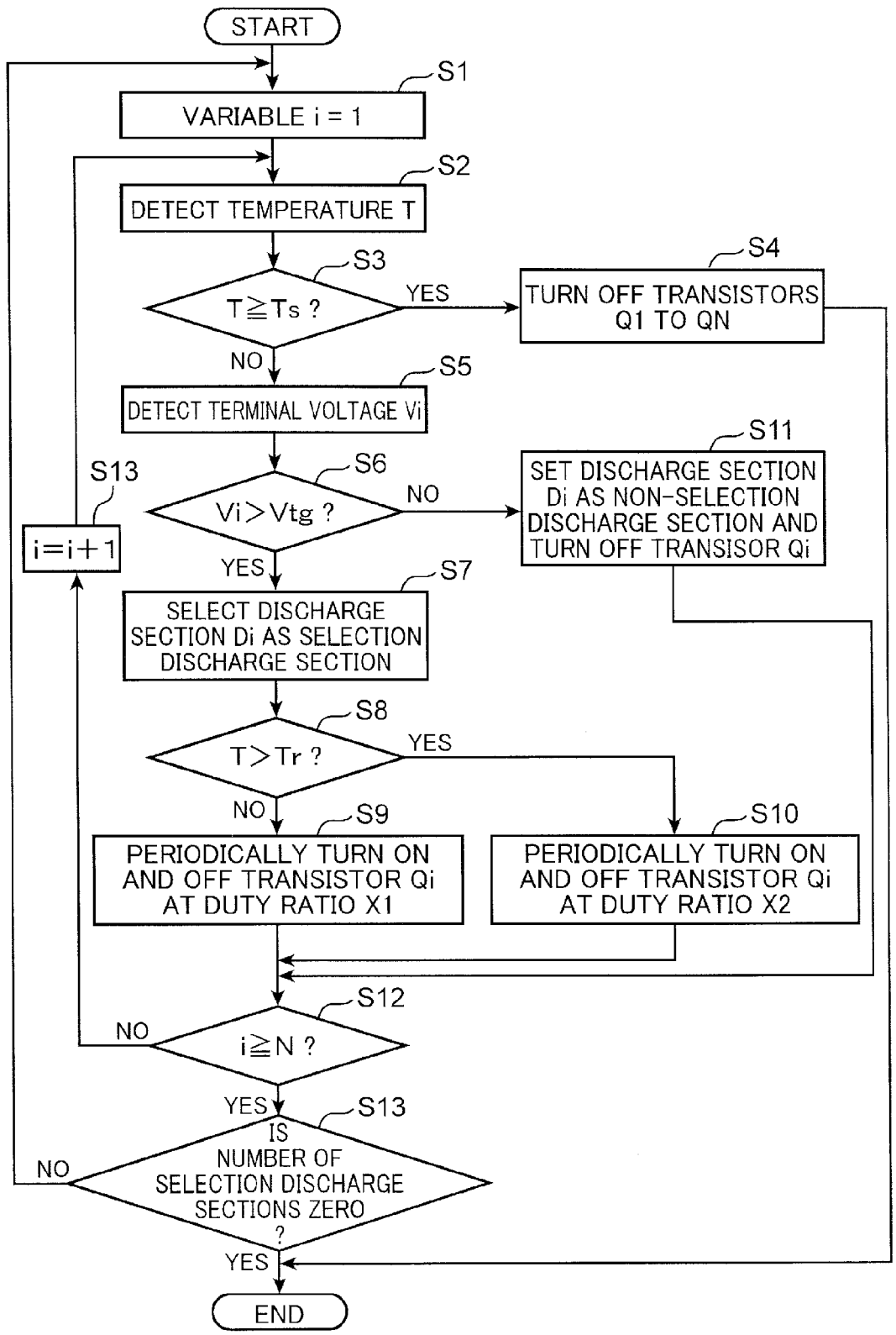
FIG. 2 is a flowchart showing an example of the operation of the power supply system shown in FIG. 1.

Next, the operation of the power supply system 1 shown in FIG. 1 will be described. FIG. 2 is a flowchart showing an example of the operation of the power supply system 1 shown in FIG. 1. When the equalization processing is started, first, the equalization controller 21 assigns 1 to a variable i (Step S1). Subsequently, the temperature T is detected by the temperature detector 23, and information indicative of the temperature T is output to the equalization controller 21 from the temperature detector 23 (Step S2).

Next, the temperature T is compared with the stop temperature Ts by the equalization controller 21 (Step S3). When the temperature T is not less than the stop temperature Ts (YES in Step S3), the transistors Q1 to QN are turned off by the equalization controller 21 (Step S4), and the equalization processing is ended.

With this, when the temperature T is not less than the stop temperature Ts, the discharge of the secondary battery B is not performed. Hence, a rise in temperature caused by the discharge doesn't occur. As a result, a risk that the ambient temperature of the electronic component influenced by heat generation of the resistor R exceeds the guaranteed operating upper limit temperature Tmax of the electronic component is reduced. With this, the reliability of the operation of the electronic component is improved, or the risk of degradation of the electronic component is reduced.

On the other hand, when the temperature T is less than the stop temperature Ts in Step S3 (NO in Step S3), a terminal voltage Vi of a secondary battery Bi is detected by the voltage detector 22 (Step S5).

Subsequently, the terminal voltage Vi is compared with the target voltage Vtg by the equalization controller 21 (Step S6). When the terminal voltage Vi is more than the target voltage Vtg (YES in Step S6), it is necessary to discharge the secondary battery Bi. Hence, a discharge section Di is selected as the selection discharge section by the equalization controller 21 (Step S7).

Next, the temperature T is compared with the reference temperature Tr by the equalization controller 21 (Step S8). When the temperature T is not more than the reference temperature Tr (NO in Step S8), the equalization controller 21 turns on and off a transistor Qi as the transistor of the selection discharge section at a period tc and a duty ratio X1 (Step S9).

On the other hand, when the temperature T is more than the reference temperature Tr (YES in Step S8), the equalization controller 21 turns on and off the transistor Qi at the period tc and a duty ratio X2 (Step S10).

When the terminal voltage Vi is not more than the target voltage Vtg in Step S6 (NO in Step S6), it is not necessary to discharge the secondary battery Bi. Hence, the discharge section Di is set as a non-selection discharge section by the equalization controller 21, the transistor Qi is turned off, and the equalization processing of the secondary battery Bi is ended (Step S11).

Figure 3:
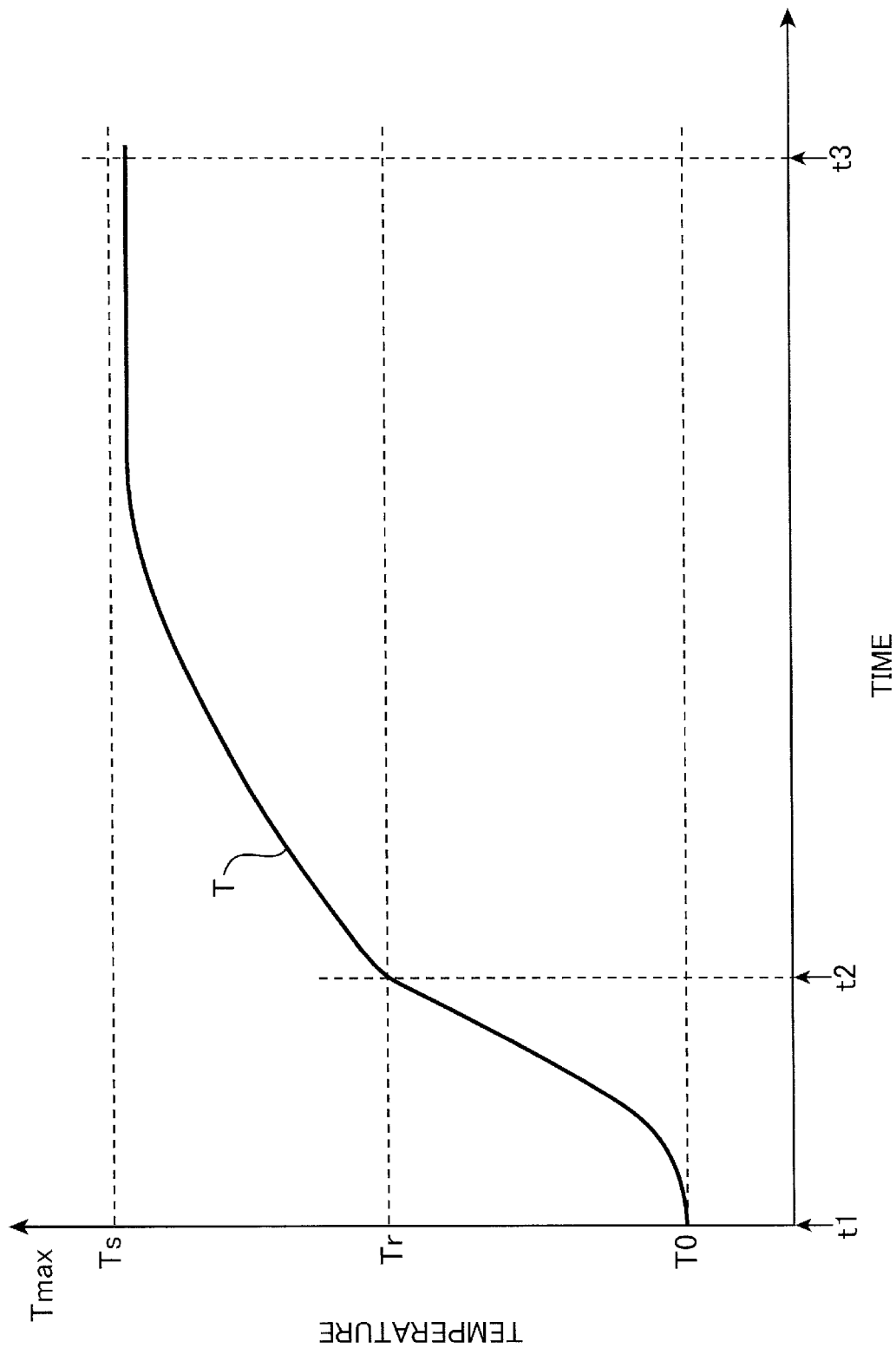
FIG. 3 is an explanatory view for describing an example of the operation of the power supply system shown in FIG. 1.
Figure 4:
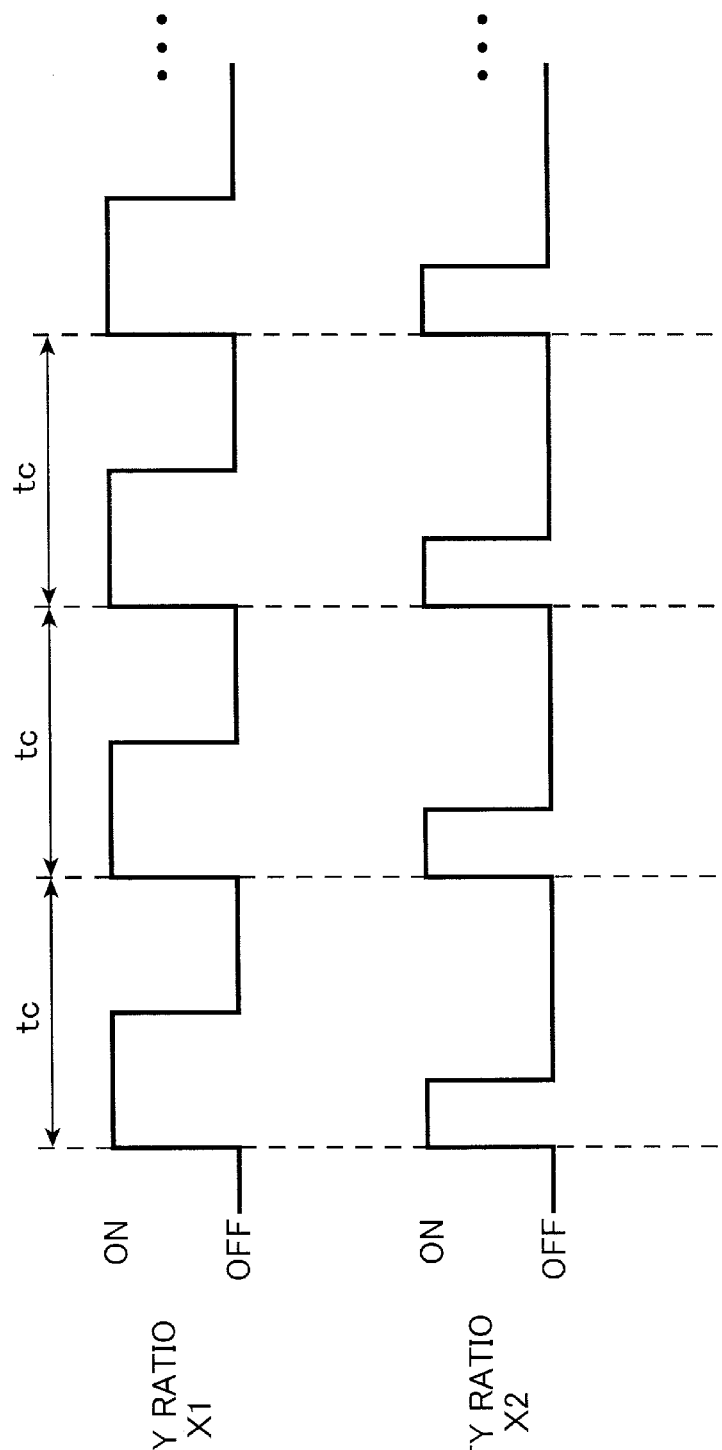
FIG. 4 is an explanatory view for describing an example of the operation of the power supply system shown in FIG. 1.

FIGS. 3, 4A and 4B are explanatory views for describing an example of the operation of the power supply system 1 shown in FIG. 1. The horizontal axis in FIG. 3 indicates the lapse of time, while the vertical axis indicates the temperature. FIGS. 4A and 4B are explanatory views showing on and off operations of the transistor Q. FIG. 4A shows a case where the transistor Q is turned on and off at the duty ratio X1, while FIG. 4B shows a case where the transistor Q is turned on and off at the duty ratio X2.

In the example shown in FIG. 3, at a timing t1 when the equalization processing is started, the temperature T is equal to an initial temperature T0 lower than the reference temperature Tr (NO in Step S8). Hence, the equalization controller 21 turns on and off the transistor Qi which is the transistor of the selection discharge section at the period tc and the duty ratio X1 (Step S9).

The largest possible duty ratio is set as the duty ratio X1, and the smallest possible resistance value is set as the resistance value of the resistor R. The duty ratio X1 may be, e.g., "1". That is, the equalization controller 21 may constantly keep the transistor Qi in an on state in Step S9. As the resistance value of the resistor R and the duty ratio X1, values with which the discharge current of the secondary battery B doesn't become an overcurrent are set.

With this, an average discharge current from the secondary battery Bi during the period tc is increased, and a time period required for the equalization processing of the secondary battery Bi is reduced.

At this point, as shown by timings t1 to t2 of FIG. 3, as the result of discharge of the large average discharge current from the secondary battery Bi, the temperature T sharply rises. However, at the timing t1 when the equalization processing is started, the temperature T is equal to the initial temperature T0 which is lower than the reference temperature Tr lower than the stop temperature Ts. Therefore, it takes time for the temperature T to reach the stop temperature Ts or the guaranteed operating upper limit temperature Tmax. Consequently, a situation in which the temperature T reaches the stop temperature Ts before the equalization of the secondary battery B is completed so that the sufficient equalization cannot be performed does not occur. A situation in which the temperature T reaches the guaranteed operating upper limit temperature Tmax and the reliability of the electronic component is lowered does not occur. Further, it is possible to reduce the time period required for the equalization processing of the secondary battery Bi.

Subsequently, when the temperature T rises to reach the reference temperature Tr (the timing t2), and the temperature T exceeds the reference temperature Tr (YES in Step S8), the equalization controller 21 turns on and off the transistor Qi at the period tc and the duty ratio X2 (Step S10).

As shown in FIG. 4B, the duty ratio X2 is smaller than the duty ratio X1. Accordingly, the average discharge current from the secondary battery Bi during the period tc when the temperature T exceeds the reference temperature Tr (between the timings t2 and t3) is reduced to be lower than the average discharge current when the temperature T is not more than the reference temperature Tr (between the timings t1 and t2).

As the period tc and the duty ratio X2, the period and the duty ratio are experimentally determined in advance, for example. The period and the duty ratio are such that the temperature T, in a case where the transistors of the discharge sections which may be simultaneously selected as the selection discharge section are continuously turned on and off at the period tc and the duty ratio X2, is brought into a steady state at a temperature lower than the stop temperature Ts as shown by the timings t2 to t3 of FIG. 3. As the period tc, 1 msec is used for example.

According to the flowchart shown in FIG. 2, all of the discharge sections D1 to DN may be simultaneously selected as the selection discharge sections. In this case, the period and the duty ratio which allow the temperature T, in a case where all of the transistors Q1 to QN are continuously turned on and off at the period tc and the duty ratio X2, to be brought into the steady state at the temperature lower than the stop temperature Ts are experimentally determined in advance, for example.

Note that, in a case where the number of discharge sections simultaneously selected as the selection discharge sections is limited to a predetermined number, the period and the duty ratio may be experimentally determined in advance, for example, as follows. Specifically, the period and the duty ratio which allow the temperature T, in a case where the largest number of the transistors Q which may be simultaneously selected as the selection discharge sections are continuously turned on and off at the period tc and the duty ratio X2, to be brought into a steady state at the temperature lower than the stop temperature Ts may be determined.

Consequently, the temperature T does not reach or exceed the stop temperature Ts between the timings t2 and t3. Hence, the risk that the temperature T reaches the stop temperature Ts before the equalization of the secondary battery Bi is completed so that the equalization processing is interrupted and the sufficient equalization cannot be performed is reduced. Further, the risk that the temperature T reaches the guaranteed operating upper limit temperature Tmax and the reliability of the electronic component is lowered is reduced.

Next, in Step S12, the variable i is compared with the number of secondary batteries N by the equalization controller 21. When the variable i is smaller than the number N (NO in Step S12), the equalization controller 21 adds 1 to the variable i in order to perform the equalization of the next secondary battery (Step S13). Then, the processing in Steps S2 to S12 is repeated.

On the other hand, when the variable i is not less than the number N (YES in Step S12), the equalization controller 21 determines whether or not the number of selection discharge sections is zero, i.e., whether or not the discharge section during the discharge operation is present (Step S13). When the number of selection discharge sections is not zero, it is necessary to continue the equalization processing. Hence, the equalization controller 21 moves the processing to Step S1, and the processing in Steps S1 to S13 is repeated again.

Subsequently, when the number of selection discharge sections becomes zero (YES in Step 13), i.e., when all of the discharge sections are set as the non-selection discharge sections, and all of the transistors Q1 to QN are turned off, the terminal voltages V1 to VN of all of the secondary batteries B1 to BN are set to the target voltage Vtg (or smaller values). Hence, the equalization processing is ended.

As described above, according to the processing in Steps S1 to S13, it is possible to reduce the risk that the ambient temperature exceeds the stop temperature Ts or the guaranteed operating upper limit temperature Tmax due to heat generation caused by the equalization processing of the secondary battery, and to reduce an increase in the time period required for the equalization processing.

Note that, as the method for controlling the discharge current, the method which changes the duty ratio of a pulsed current, i.e., the method which changes the discharge current by what is called PWM (Pulse Width Modulation) has been described. However, the method for controlling the discharge current is not limited thereto, and various methods may be used.

Figure 5:
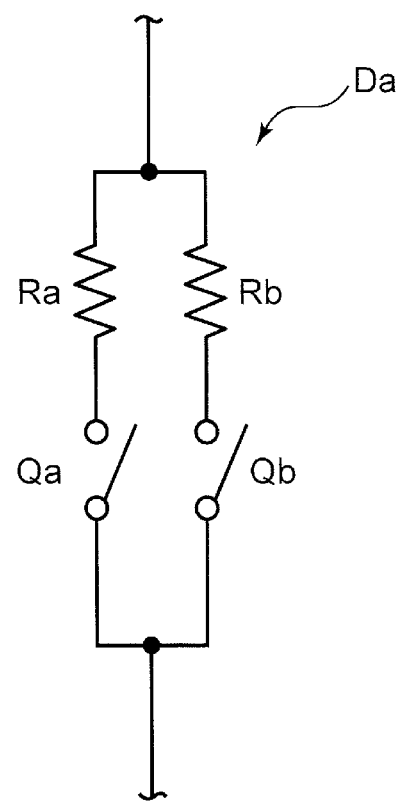
FIG. 5 is a circuit diagram showing the configuration of a modification of a discharge section shown in FIG. 1.

FIG. 5 is a circuit diagram showing the configuration of a discharge section Da as a modification of the discharge section D shown in FIG. 1. The discharge section Da shown in FIG. 5 includes a series circuit of a resistor Ra and a switching element Qa, and a series circuit of a resistor Rb and a switching element Qb. The series circuits are connected in parallel. The resistance value of each of the resistors Ra and Rb is defined as r. The resistance value of the discharge section Da is infinite (opened) when both of the switching elements Qa and Qb are off. When one of the switching elements Qa and Qb is on and the other one thereof is off, the resistance value of the discharge section Da is equal to r ($\Omega$). When both of the switching elements Qa and Qb are on, the resistance value of the discharge section Da is equal to r/2 ($\Omega$). That is, the discharge section Da is a load circuit having the variable resistance value.

In a case where the discharge section Da is used instead of the discharge section D shown in FIG. 1, the equalization controller 21 may appropriately turn on the switching elements Qa and Qb in Step S9 of FIG. 2. The equalization controller 21 may appropriately turn on one of the switching elements Qa and Qb in Step S10. The equalization controller 21 may appropriately turn off the switching elements Qa and Qb in Steps S4 and S11.

Note that the resistance value of the resistor Ra may be set to ra, and the resistance value of the resistor Rb may be set to rb larger than ra. The equalization controller 21 may turn on the switching element Qa and turn off the switching element Qb in Step S9 of FIG. 2. The equalization controller 21 may turn off the switching element Qa and turn on the switching element Qb in Step S10. The equalization controller 21 may turn off the switching elements Qa and Qb in Steps S4 and S11.

As the resistance value r, the resistance value which allows the temperature T, in a case where one of the switching elements Qa and Qb of the discharge section which can be simultaneously selected as the selection discharge section is kept on, to be brought into a steady state at the temperature lower than the stop temperature Ts is experimentally determined in advance, for example. In addition, as the resistance value rb, the resistance value which allows the temperature T, in a case where the switching element Qb of the discharge section which can be simultaneously selected as the selection discharge section is kept on, to be brought into a steady state at the temperature lower than the stop temperature Ts is experimentally determined in advance, for example.

Alternatively, the equalization controller 21 may turn on and off the switching element Qa at the period tc and the duty ratio X1 and turn off the switching element Qb in Step S9 of FIG. 2. The equalization controller 21 may turn off the switching element Qa and turn on and off the switching element Qb at the period tc and the duty ratio X2 in Step S10.

The equalization controller 21 may turn off the switching elements Qa and Qb in Steps S4 and S11.

In this case, as the resistance values r and rb, the period tc, and the duty ratio X2, the resistance values, the period, and the duty ratio which allow the temperature T, in a case where the switching element Qb of the discharge section which may be simultaneously selected as the selection discharge section is continuously turned on and off at the period tc and the duty ratio X2, to be brought into a steady state at the temperature lower than the stop temperature Ts are experimentally determined in advance, for example. Thus, when the adjustment of the resistance value of the discharge section Da and the PWM control are combined, flexibility in the control of the discharge current in discharging the secondary battery B is increased.

Note that the assembled battery 3 and the equalization circuit 2 may be divided into blocks. For example, the assembled battery 3 may be divided into blocks which are connected in series. The discharge sections, which respectively discharge the secondary batteries included in the blocks, may be provided corresponding to the blocks. Further, the voltage detector 22, which respectively measures the terminal voltages of the secondary batteries, may be provided corresponding to the blocks. In addition, each block may include, instead of the equalization controller 21, a controller which transmits the respective terminal voltages detected by the voltage detector 22, and turns on and off the transistor Q or the switching elements Qa and Qb in response to the commands from the equalization controller 21 which is provided outside the blocks. The equalization controller 21 may receive the terminal voltages related to the blocks, and may control on and off of the transistor Q and the switching elements Qa and Qb corresponding to the blocks, through communication with the controllers. The entire power supply system 1 may be thus configured.

Although two types of the duty ratios are used in the embodiment, m types (m≥3) of the duty ratios may also be used. In this case, threshold temperatures Ta, Tb, . . . , Tk are set between the initial temperature T0 and the reference temperature Tr in ascending order. When the temperature exceeds the respective threshold temperatures, the duty ratio is changed to Xa, Xb, . . . , Xk. The duty ratios Xa, Xb, . . . , Xk are values between the duty ratio X1 and the duty ratio X2, and gradually become smaller. That is, T0<Ta< Tb< . . . <Tk<Tr, and X1>Xa>Xb> . . . >Xk>X2 are established.

In this case, in a case where the secondary battery is discharged by the discharge section selected as the selection discharge section, the equalization controller 21 may control the discharge current such that the discharge current is gradually (stepwise) reduced as the temperature T is higher.

The example in which the temperature is constantly measured by the temperature detector 23 and the temperature T is thereby detected has been described. However, the reference temperature Tr may be determined by adding temperature rise estimated from the discharge current to the initial temperature T0. For example, the equalization controller 21 may cause the temperature detector 23 to detect the initial temperature T0 which is a temperature at the timing when the equalization processing is started. Thereafter, the equalization controller 21 may estimate the temperature rise of the temperature T from the discharge current by the discharge section selected as the selection discharge section (in a case where there are selection discharge sections, the total of the discharge currents by the discharge sections) and a discharge duration. The equalization controller 21 may calculate the current value of the temperature T by adding the estimated value of the temperature rise to the initial temperature T0.

For example, an LUT (Look Up Table) which stores the estimated temperature rise value of the temperature T in association with the combination of the discharge current value and its discharge duration is stored in a nonvolatile storage element such as a ROM or the like. Subsequently, by referring to the LUT, the equalization controller 21 may acquire the temperature stored in association with the value of the discharge current by the selection discharge section and the duration of the current value up to the present in the LUT as the current value of the temperature T.

In this case, the equalization controller 21 may calculate the discharge current by the discharge section selected as the selection discharge section by dividing the terminal voltage V corresponding to the discharge section D selected as the selection discharge section by the resistance value of the resistor R.

Note that the above-described specific embodiment mainly includes the invention having the following configurations.

An equalization circuit according to the present invention includes: discharge sections which are provided correspondingly to secondary batteries respectively, and discharge the corresponding secondary batteries to convert energy resulting from the discharge into heat; a temperature detector which detects a temperature under the converted heat; and an equalization controller which selects a discharge section as a selection discharge section, the selection discharge section corresponding to a secondary battery of the secondary batteries to be discharged, the equalization controller causing the selection discharge section to discharge the corresponding secondary battery, and equalizing electric quantities accumulated in the secondary batteries, wherein if the secondary battery is discharged by the selection discharge section and if the temperature detected by the temperature detector is higher than a predetermined reference temperature, the equalization controller reduces a discharge current to a value lower than a value when the temperature is lower than the reference temperature.

In addition, a power supply system according to the present invention includes the above-described equalization circuit and the secondary batteries.

According to these configurations, in order to equalize the electric quantities accumulated in the secondary batteries, the discharge section corresponding to the secondary battery to be discharged is selected as the selection discharge section. Subsequently, the secondary battery corresponding to the selection discharge section is discharged by the selection discharge section, and the energy resulting from the discharge is converted into the heat. At this point, when a detection temperature detected by the temperature detector is lower than the reference temperature, it may be considered that there is a margin to the upper limit of the operating temperature of the electronic component influenced by the discharge section. At this time, the discharge current is increased by the equalization controller. Hence, it is possible to reduce a time period required for the equalization.

On the other hand, when the detection temperature detected by the temperature detector is higher than the reference temperature, it may be considered that there is not the margin to the upper limit of the operating temperature of the electronic component influenced by the discharge section. At this time, the discharge current is reduced by the equalization controller, and the amount of heat generation is reduced. As a result, it is possible to reduce a risk that the ambient temperature exceeds a predetermined temperature due to the heat generation caused by the equalization processing of the secondary battery, and to reduce a chance of increase in time period required for the equalization processing as compared with a case where the discharge current is uniformly reduced.

Further, if the secondary battery is discharged by the selection discharge section and if the temperature is lower than the reference temperature, it is preferable that the equalization controller makes the discharge current of the secondary battery smaller as the temperature is higher.

According to this configuration, if the secondary battery is discharged by the selection discharge section and if the temperature is lower than the reference temperature, the equalization controller makes the discharge current of the secondary battery smaller as the temperature is higher. With this, in the temperature range in which the detection temperature detected by the temperature detector does not reach the reference temperature, when the detection temperature rises due to the conversion of the energy resulting from the discharge into the heat, the discharge current is gradually reduced correspondingly to the rise in the temperature. Hence, a risk that the ambient temperature of the discharge section sharply rises is reduced. As a result, a temperature stress applied to the electronic component provided in the vicinity of the discharge section is reduced.

Furthermore, it is preferable that the equalization controller causes the selection discharge section to discharge the secondary battery with a periodic and pulsed current, and adjusts the discharge current by changing a duty ratio of the pulsed current.

According to this configuration, the discharge current may be controlled by changing the duty ratio of the pulsed current. Therefore, it is easy to reduce the discharge current when the temperature is higher than the reference temperature.

Moreover, it is preferable that each of the discharge sections includes a series circuit connected to the corresponding secondary battery in parallel, the series circuit having a resistor and a switching element connected in series, and that the equalization controller generates the pulsed current by turning the switching element on and off in a pulsed manner.

According to this configuration, it is possible to generate the pulsed current by turning on and off the switching element, and to change the duty ratio by adjusting the duration in which the switching element is on. Hence, it is easy to control the discharge current.

Additionally, it is preferable that the equalization controller causes the discharge sections to stop discharging the secondary batteries, when the temperature detected by the temperature detector is not less than a stop temperature, which is predetermined to be higher than the reference temperature, and that a duty ratio is predetermined as the duty ratio under a condition that the temperature is higher than the reference temperature such that a rise in the temperature detected by the temperature detector under continuous flow of the pulsed current having the predetermined duty ratio by the selection discharge section is brought into a steady state at a temperature lower than the stop temperature.

According to this configuration, the discharge by the discharge sections is stopped when the temperature detected by the temperature detector is a high temperature not less than the stop temperature. Hence, the temperature rise caused by the discharge does not occur. As a result, a risk that the ambient temperature of the electronic component influenced by the heat generation of the discharge section exceeds a guaranteed operating upper limit temperature of the electronic component is reduced. In addition, even in a case where the discharge by the selection discharge section is continued using the pulsed current having the duty ratio when the temperature detected by the temperature detector is higher than the reference temperature, the rise in the temperature detected by the temperature detector is brought into the steady state at a temperature lower than the stop temperature. Hence, a risk that the temperature becomes not less than the stop temperature by the heat generation caused by the discharge of the selection discharge section and the discharge is stopped before the equalization processing is completed is reduced.

In addition, each of the discharge sections may include a load having a variable resistance value, and the equalization controller may adjust the discharge current by changing the resistance value of the load.

According to this configuration, it is possible to reduce the discharge current by increasing the resistance value of the load, and to increase the discharge current by reducing the resistance value of the load. Hence, it is easy to adjust the discharge current.

Further, it is preferable that the equalization controller causes the discharge sections to stop discharging the secondary batteries, when the temperature detected by the temperature detector is not less than a stop temperature, which is predetermined to be higher than the reference temperature, and that a resistance value is predetermined as the resistance value under a condition that the temperature is higher than the reference temperature such that a rise in the temperature detected by the temperature detector under continuous discharge of the secondary battery by the selection discharge section in a state where the resistance value of the load is set to the predetermined resistance value is brought into a steady state at a temperature lower than the stop temperature.

According to this configuration, the discharge by the discharge sections is stopped when the temperature detected by the temperature detector is not less than the stop temperature. Thus, the temperature rise caused by the discharge does not occur. As a result, the risk that the ambient temperature of the electronic component influenced by the heat generation of the discharge section exceeds the guaranteed operating upper limit temperature of the electronic component is reduced. In addition, even in a case where the discharge by the selection discharge section is continued in a state where the resistance value of the load is increased when the temperature detected by the temperature detector is higher than the reference temperature, the rise in the temperature detected by the temperature detector is brought into the steady state at a temperature lower than the stop temperature. Hence, the risk that the temperature becomes not less than the stop temperature by the heat generation caused by the discharge of the selection discharge section and the discharge is stopped before the equalization processing is completed is reduced.

Furthermore, it is preferable that each of the discharge sections includes a load having a variable resistance value, and that the equalization controller causes the selection discharge section to discharge the secondary battery with a periodic and pulsed current, and determines the resistance value of the discharge section and a duty ratio of the pulsed current such that the discharge current when the temperature is higher than the reference temperature is reduced to a value lower than when the temperature is lower than the reference temperature.

According to this configuration, it is possible to control the discharge current using the combination of the resistance value of the discharge section and the duty ratio of the pulsed current. Hence, flexibility in the adjustment of the discharge current is increased.

Moreover, instead of the temperature, the equalization controller may compare the reference temperature with a temperature obtained by adding a temperature rise value to an initial temperature, the temperature rise value being estimated from the discharge current by the selection discharge section, the initial temperature being a temperature detected by the temperature detector when the discharge by the selection discharge section is started.

According to this configuration, it is not necessary to perform the temperature detection by the temperature detector after the initial temperature is detected by the temperature detector.

Additionally, a vehicle according to the present invention includes the above-described power supply system, and the equalization controller causes the selection discharge section to discharge the secondary battery when the vehicle is not running According to this configuration, when the vehicle is running, that is, when supplied electric power from the secondary battery required to cause the vehicle to run is large, the discharge of the secondary battery for the equalization processing is not performed. As a result, a risk that the supplied electric power from the secondary battery becomes insufficient due to the discharge for the equalization processing when the vehicle is running is reduced.

INDUSTRIAL APPLICABILITY

The present invention may be suitably used as the equalization circuit and the power supply system used in portable personal computers, digital cameras, mobile phones, electric vehicles, hybrid cars, and other various battery-equipped devices.

The invention claimed is:

1. An equalization circuit comprising:
discharge sections which are provided correspondingly to secondary batteries respectively, and discharge the corresponding secondary batteries to convert energy resulting from the discharge into heat;
a temperature detector which detects a temperature under the converted heat; and
an equalization controller which selects a discharge section as a selection discharge section, the selection discharge section corresponding to a secondary battery of the secondary batteries to be discharged, the equalization controller causing the selection discharge section to discharge the corresponding secondary battery with a periodic and pulsed current, adjusting a discharge current by changing a duty ratio of the pulsed current, and equalizing electric quantities accumulated in the secondary batteries, wherein
if the secondary battery is discharged by the selection discharge section and if the temperature detected by the temperature detector is higher than a predetermined reference temperature, the equalization controller reduces the discharge current to a value lower than a value when the temperature detected by the temperature detector is lower than the reference temperature,
the equalization controller causes the discharge sections to stop discharging the secondary batteries, when the temperature detected by the temperature detector is not less than a stop temperature, which is predetermined to be higher than the reference temperature, and
the duty ratio is predetermined under a condition that the temperature detected by the temperature detector is higher than the reference temperature such that a rise in the temperature detected by the temperature detector under continuous flow of the pulsed current having the predetermined duty ratio by the selection discharge section is brought into a steady state at a temperature lower than the stop temperature.

2. The equalization circuit according to claim 1, wherein if the secondary battery is discharged by the selection discharge section and if the temperature is lower than the reference temperature, the equalization controller makes the discharge current of the secondary battery smaller as the temperature is higher.

3. The equalization circuit according to claim 1, wherein
each of the discharge sections includes a series circuit connected to the corresponding secondary battery in parallel, the series circuit having a resistor and a switching element connected in series, and
the equalization controller generates the pulsed current by turning the switching element on and off in a pulsed manner.

4. The equalization circuit according to claim 1, wherein
each of the discharge sections includes a load having a variable resistance value, and
the equalization controller causes the selection discharge section to discharge the secondary battery with a periodic and pulsed current, and determines the resistance value of the discharge section and a duty ratio of the pulsed current such that the discharge current when the temperature is higher than the reference temperature is reduced to a value lower than when the temperature is lower than the reference temperature.

5. The equalization circuit according to claim 1, wherein instead of the temperature, the equalization controller compares the reference temperature with a temperature obtained by adding a temperature rise value to an initial temperature, the temperature rise value being estimated from the discharge current by the selection discharge section, the initial temperature being a temperature detected by the temperature detector when the discharge by the selection discharge section is started.

6. A power supply system comprising:
the equalization circuit according to claim 1; and
the secondary batteries.

7. A vehicle comprising:
the power supply system according to claim 6, wherein
the equalization controller causes the selection discharge section to discharge the secondary battery when the vehicle is not running.

* * * * *